United States Patent [19]
Decker et al.

[11] Patent Number: 5,213,387
[45] Date of Patent: May 25, 1993

[54] CROSS BODY MOTOR VEHICLE SECURITY SHADE

[75] Inventors: John H. Decker, Livonia; Eugene M. Halajian, Mt. Clemons; Joseph P. Wieczorek, Madison Heights, all of Mich.

[73] Assignee: Takata, Inc., Auburn Hills, Mich.

[21] Appl. No.: 864,669

[22] Filed: Apr. 7, 1992

[51] Int. Cl.⁵ .............................................. B60R 5/04
[52] U.S. Cl. ................................................. 296/37.16
[58] Field of Search ............... 296/37.16, 98; 160/315, 160/318, 323.1

[56] References Cited

U.S. PATENT DOCUMENTS

| | | | |
|---|---|---|---|
| 2,867,471 | 1/1959 | Coon | 296/37.16 |
| 3,004,790 | 10/1961 | Mayer | 296/26 |
| 3,181,911 | 5/1965 | Peras | 296/37.16 |
| 4,127,301 | 11/1978 | Syrowik | 296/37.16 |
| 4,139,231 | 2/1979 | Lang et al. | 296/37.16 |
| 4,168,094 | 9/1979 | Yagi | 296/37.16 |
| 4,222,601 | 9/1980 | White et al. | 296/37.16 |
| 4,671,557 | 6/1987 | Lemp | 296/37.16 |
| 5,050,923 | 9/1991 | Petelka | 296/98 |

Primary Examiner—Robert R. Song
Attorney, Agent, or Firm—Harness, Dickey & Pierce

[57] ABSTRACT

A roller shade assembly for motor vehicle applications. For covering an interior compartment area of a motor vehicle. The assembly of this invention is mounted in such a manner that the flexible shade panel is extended in a direction transverse to the longitudinal axis of the vehicle, or in the "cross-body" direction. This orientation eliminates the requirement that the roller tube assembly be removable from the vehicle to avoid obstructing the cargo compartment when large items are placed in it or when the cargo compartment is enlarged by folding forward a rear seat back. The configuration further enables the shade to be extended and retracted either from the rear vehicle cargo door or from within the vehicle.

7 Claims, 2 Drawing Sheets

CROSS BODY MOTOR VEHICLE SECURITY SHADE

BACKGROUND AND SUMMARY OF THE INVENTION

This invention relates to a roller type shade and particularly to one adapted for use in a motor vehicle for covering a rear interior compartment area of the vehicle.

In many styles of modern motor vehicles, a rear compartment area is provided for the storage of cargo or personal items. For enhanced security, motor vehicle manufacturers often provide a retractable shade panel which can be extended to cover the compartment area. Typically, such security shades are comprised of a roller tube mounted to a support structure in the vehicle with a flexible fabric panel wrapped onto the roller tube. The security shade panel can be extended to cover the compartment area or retracted onto the roller tube when it is not needed. Security shades typically also have a means for conveniently enabling them to be removed and reinstalled in the vehicle. The edge of the fabric shade panel opposite the edge attached to the roller tube normally has a pull tube or stiffener. The pull tube may also have a handle to enable the shade panel to be conveniently withdrawn from the roller tube. A mechanism is provided to hold the pull tube in the extended position to maintain the cover over the compartment area. Clips or other fasteners are often used at the opposite lateral edges of the pull tube to maintain it in the extended position.

Conventional vehicle security shades are mounted such that the roller tube is positioned across the compartment area with the shade panel being drawn rearward toward the vehicle's rear cargo door to the extended position. For many vehicles having security shades the shade is mounted behind a rear seat back which can be folded down to enlarge the cargo area of the vehicle. When the cargo area is enlarged in this way, the shade assembly needs to be removed so that it does not obstruct the cargo area. For this reason, vehicle security shades often feature a mounting system which enables them to be easily detached and removed from the vehicle. This requirement involves additional components incorporated into the security shade which adds cost and complexity to the overall unit.

Since conventional roller shades are extended toward the rear of the vehicle and are maintained in that position by engaging the pull tube with mounting brackets in the compartment area, generally the shade can be extended and retracted only from the rear cargo door of the vehicle. Therefore, the operator must be outside of the vehicle to change the position of the security shade cover.

The roller shade assembly according to this invention improves over existing devices with respect to the above referenced areas of concern. The roller shade assembly of this invention is mounted in the vehicle in such a manner that the flexible shade panel is extended in a transverse or "cross-body" direction, from one side of the vehicle's cargo compartment to the opposite side. With this configuration, when the shade panel is in its retracted position, the entire cargo area is unobstructed. This feature enables the roller shade assembly to be fully incorporated into the vehicle interior compartment trim, and, therefore, a quick dismounting feature is not needed. By providing the shade panel stiffener tube with a centrally positioned handle for moving the shade, the handle can be accessed either from the occupant compartment of the vehicle or from the rear compartment door. In some applications, the cross body configuration also provides the advantage of reducing interference problems associated with the presence of a spare tire or other fixed obstructions in a rear compartment area.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
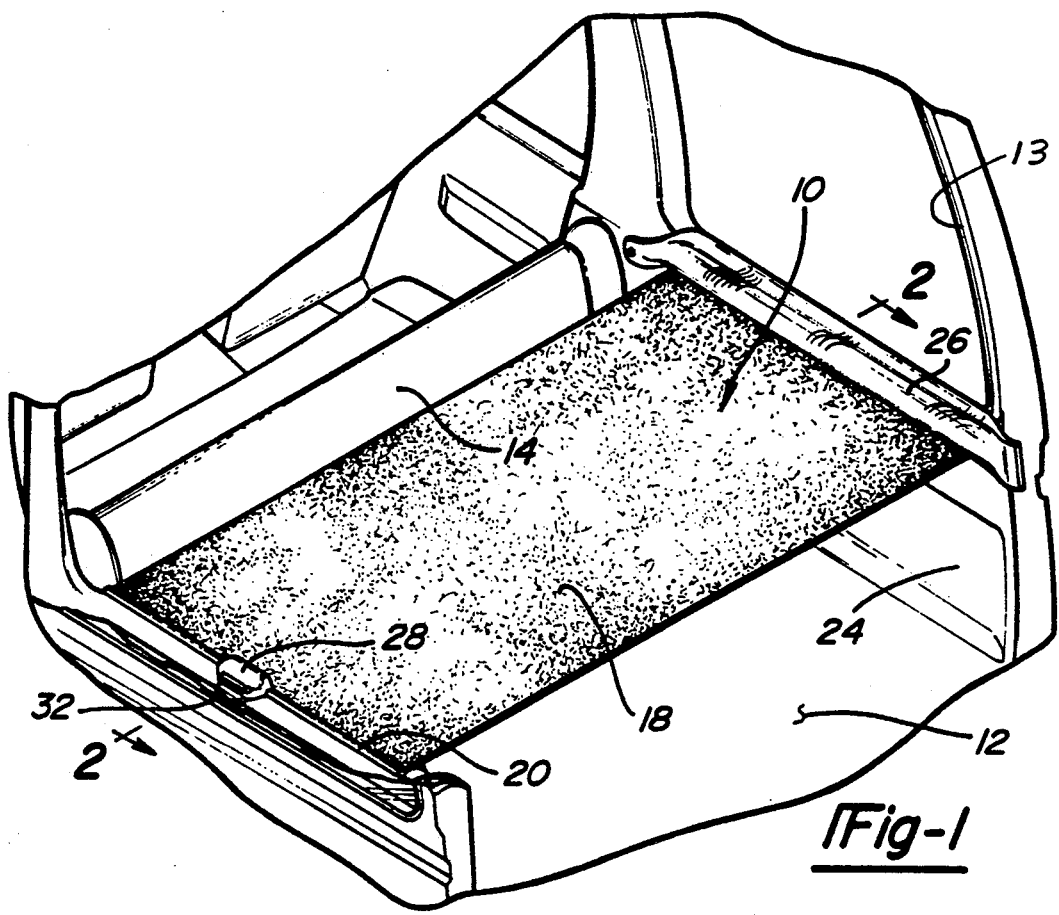
FIG. 1 is a pictorial view of a roller shade assembly in accordance with this invention shown mounted within the interior cargo compartment of a motor vehicle with the shade panel fully extended.

A roller shade assembly in accordance with this invention is shown in FIG. 1 and is generally designated there by reference number 10. Roller shade assembly 10 is shown mounted within a motor vehicle interior cargo compartment 12. The portion of cargo compartment 12 covered by shade assembly 10 is bounded to the rear by a rear cargo door (not shown) which closes rear access opening 13 and at the front by seat back 14. In many vehicles, seat back 14 can be folded forward to enlarge the cargo compartment.

Roller shade assembly 10 generally comprises roller tube assembly 16, flexible shade panel 18, and pull tube 20. Shade roller tube assembly 16 is provided to enable shade panel 18 to be retracted or extended from a hollow roller tube 22 attached to one edge of the shade panel. Roller tube assembly 16 includes an internal rotational biasing spring to exert a rotational biasing force on roller tube 22. Pull tube 20 is affixed to an edge of flexible shade panel 18 opposite the edge affixed to roller tube 22 and acts as a stiffener for that edge of the shade panel. Various designs for a roller tube assembly and shade panel can be incorporated in practicing this invention, including those described by assignees commonly owned U.S. Pat. Nos. 4,776,625; 4,502,674; 4,482,137; 4,222,601 and 4,139,231, which are hereby incorporated by reference.

In accordance with a principal feature of this invention, roller tube assembly 16 is shown mounted directly to an interior trim panel 24 along a lateral side of cargo compartment 12. With this configuration, flexible shade panel 18 extends in a direction transverse to the longitudinal axis of the motor vehicle, or in the cross-body direction. In order to enhance the appearance of the installed roller shade assembly 10, trim cover 26 is provided which extends over roller tube assembly 16 and any portion of the shade panel rolled onto it. Trim cover 26 also serves to protect the mechanical components of roller tube assembly 16, and keeps foreign matter from interfering with its operation.

Figure 2:
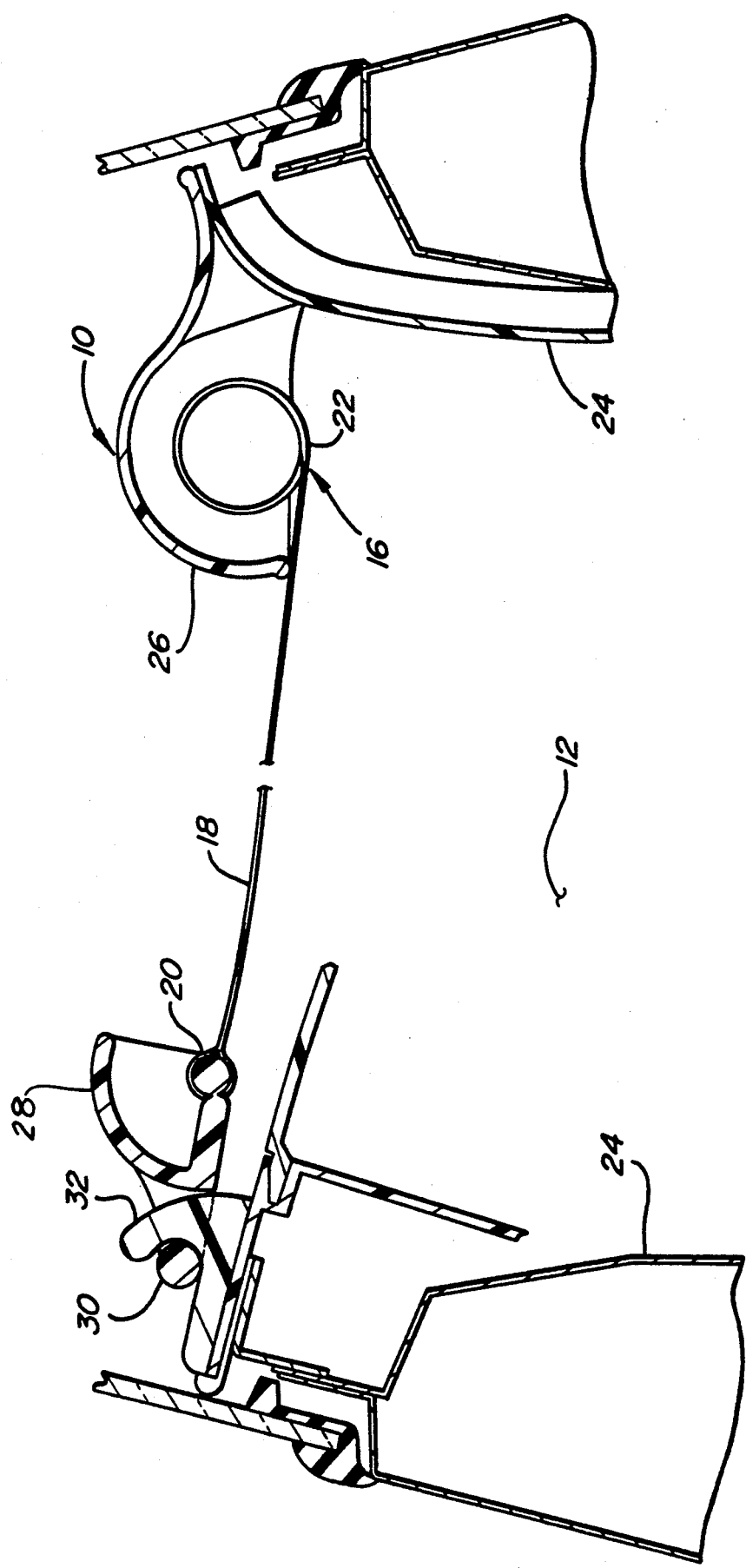
FIG. 2 is a cross-sectional view taken along line 2—2 of FIG. 1.

Roller shade assembly 10 is preferably extended and retracted by grasping handle 28 which is conveniently located at about the midpoint of pull tube 20. Handle 28 includes an attachment ring 30 which engages with hook 32, as best shown in FIG. 2. Since tension is maintained on shade panel 18, the panel will remain in the extended condition until handle ring 30 is disengaged from hook 32.

Figure 3:
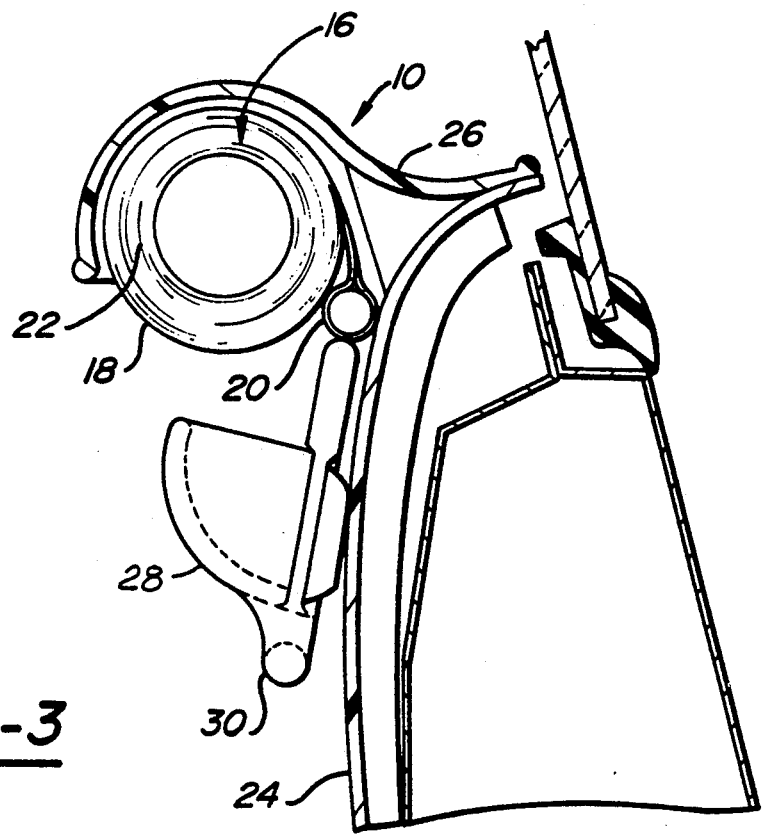
FIG. 3 is a cross-sectional view taken along line 2—2 in FIG. 1 except showing the shade panel in a fully retracted position.

FIG. 3 shows roller shade assembly 10 with shade panel 18 fully retracted. As shown, handle 28 is shown lying along trim panel 24, but in an alternate configuration could be restrained in another manner to provide an unobstructed cargo area and reduce the likelihood of rattles caused by road and drivetrain vibrations.

As is evident from FIG. 1, once shade panel 18 is retracted, the entire cargo compartment area 12 is unobstructed, even in the event that seat back 14 is folded down. In addition, since the unit is neatly stowed against interior trim compartment cover 24 it need not be completely removed when the shade panel is retracted. Since handle 28 is positioned at the midpoint of pull tube 20 it can be accessed by reaching forward into the vehicle from a rear cargo door, or by an occupant reaching rearward from the area of seat back 14.

While the above description constitutes the preferred embodiments of the present invention, it will be appreciated that the invention is susceptible of modification, variation and change without departing from the proper scope and fair meaning of the accompanying claims.

We claim:

1. A security shade for a cargo area of a motor vehicle interior compartment wherein said cargo area is bounded at its front by a passenger seat, at its rear by a rear access opening and by laterally separated sides of said compartment, comprising:
   a flexible shade panel;
   a roller tube affixed to a first edge of said shade panel;
   roller tube support means for rotationally biasing said roller tube to allow said shade panel to wrap onto said roller tube during retraction and unwrap from said roller tube during extension,
   mounting means for mounting said roller tube to extend longitudinally along one of said compartment sides and for allowing said shade panel to be extended and retracted laterally across said cargo area; and
   restraining means affixed at the other of said compartment sides for restraining said shade panel in said extended position across said cargo area.

2. A security shade according to claim 1 further comprising a stiffener tube affixed to said shade panel along a second edge opposite said first edge.

3. A security shade according to claim 2 wherein said restraining means comprises a handle along said stiffener tube approximately located at a midpoint along said stiffener tube.

4. A security shade according to claim 1 wherein said restraining means comprises a hook for engaging said flexible shade panel.

5. A security shade according to claim 1 further comprising a trim cover extending along said one of said compartment sides for covering said roller tube.

6. A security shade for a cargo area of a motor vehicle interior compartment wherein said cargo area is bounded at its front by a passenger seat, at its rear by a rear access opening and by laterally separated sides of said compartment, comprising:
   a flexible shade panel;
   a roller tube affixed to a first edge of said shade panel;
   a stiffener tube affixed to said shade panel along a second edge of said panel opposite said first edge;
   a handle affixed to said shade second edge positioned approximately at the midpoint of said stiffener tube;
   roller tube support means for rotationally biasing said roller tube to allow said shade panel to warp onto said roller tube during retraction and unwrap from said roller tube during extension;
   mounting means for mounting said roller tube to extend longitudinally along one of said compartment sides and for allowing said shade panel to be extended and retracted laterally across said cargo area; and
   restraining means affixed at the other of said compartment sides for restraining said shade panel in said extended position across said cargo area.

7. A security shade for a cargo area according to claim 6 further comprising a trim cover extending along said one of said compartment sides for covering said roller tube.

* * * * *

UNITED STATES PATENT AND TRADEMARK OFFICE
CERTIFICATE OF CORRECTION

PATENT NO. : 5,213,387

DATED : May 25, 1993

INVENTOR(S) : John H. Decker, Eugene M. Halajian, and Joseph P. Wieczorek

It is certified that error appears in the above-identified patent and that said Letters Patent is hereby corrected as shown below:

Column 4, line 32, Claim 6, after "panel to" please delete "warp" and insert --wrap--.

Signed and Sealed this

Eighth Day of February, 1994

Attest:

BRUCE LEHMAN

*Attesting Officer*     *Commissioner of Patents and Trademarks*